(12) United States Patent
Luo

(10) Patent No.: US 11,157,254 B2
(45) Date of Patent: Oct. 26, 2021

(54) METHOD, APPARATUS, AND DEVICE FOR PROCESSING WEB APPLICATION PACKAGE

(71) Applicant: Advanced New Technologies Co., Ltd., Grand Cayman (KY)

(72) Inventor: Zhi Luo, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 16 days.

(21) Appl. No.: 16/702,776

(22) Filed: Dec. 4, 2019

(65) Prior Publication Data

US 2020/0110593 A1    Apr. 9, 2020

Related U.S. Application Data

(63) Continuation of application No. PCT/CN2018/103499, filed on Aug. 31, 2018.

(30) Foreign Application Priority Data

Sep. 6, 2017  (CN) .......................... 201710794843.7

(51) Int. Cl.
*G06F 9/44*     (2018.01)
*G06F 9/445*    (2018.01)
(Continued)

(52) U.S. Cl.
CPC ................ *G06F 8/61* (2013.01); *H04L 67/02* (2013.01); *H04L 67/34* (2013.01)

(58) Field of Classification Search
CPC ............ G06F 8/61; H04L 67/02; H04L 67/34
See application file for complete search history.

(56) References Cited

U.S. PATENT DOCUMENTS 8,234,348 B1 *  7/2012  Tulchinsky ......... H04L 67/2842
                                            709/214
9,817,646 B1 * 11/2017  Chen ........................ G06F 8/61
(Continued)

FOREIGN PATENT DOCUMENTS

CN         101316226        12/2008
CN         101729753         6/2010
(Continued)

OTHER PUBLICATIONS

Jason Lee, Deploying Web Applications in Enterprise Scenarios, 2012, pp. 1-10. https://docs.microsoft.com/en-us/aspnet/web-forms/overview/deployment/advanced-enterprise-web-deployment/excluding-files-and-folders-from-deployment (Year: 2012).*

(Continued)

*Primary Examiner* — Mongbao Nguyen
(74) *Attorney, Agent, or Firm* — Fish & Richardson P.C.

(57) ABSTRACT

Implementations of the present specification disclose a method, an apparatus, and a device for processing a web application package. In the method, processing the web application package includes: determining a resource required by a web application; storing the resource; determining a resource address corresponding to a storage location of the resource; and generating a web application package that comprises the resource address, wherein the web application package excludes the resource corresponding to the resource address.

14 Claims, 6 Drawing Sheets

(51) Int. Cl.
  *G06F 8/61* (2018.01)
  *H04L 29/08* (2006.01)

(56) References Cited

U.S. PATENT DOCUMENTS

| | | | | |
|---|---|---|---|---|
| 10,025,574 | B1* | 7/2018 | Sargent | G06F 8/61 |
| 10,089,108 | B1* | 10/2018 | Noble | G06F 8/71 |
| 10,394,540 | B1* | 8/2019 | Bentley | G06F 8/61 |
| 2004/0019596 | A1 | 1/2004 | Taylor et al. | |
| 2007/0169041 | A1* | 7/2007 | Kojima | G06F 9/445 |
| | | | | 717/148 |
| 2013/0013745 | A1 | 1/2013 | Whittick et al. | |
| 2013/0144981 | A1* | 6/2013 | Koreeda | G06Q 10/00 |
| | | | | 709/219 |
| 2013/0318208 | A1* | 11/2013 | Seshadri | G06F 16/957 |
| | | | | 709/219 |
| 2013/0328208 | A1* | 12/2013 | Holmes | H01L 21/76883 |
| | | | | 257/774 |
| 2014/0019953 | A1* | 1/2014 | Kolesnikov | G06F 8/61 |
| | | | | 717/170 |
| 2014/0207851 | A1* | 7/2014 | Qu | H04L 43/10 |
| | | | | 709/203 |
| 2015/0264118 | A1* | 9/2015 | Ito | H04L 67/02 |
| | | | | 709/203 |
| 2015/0317167 | A1* | 11/2015 | Zhou | G06F 9/445 |
| | | | | 717/166 |
| 2015/0373034 | A1* | 12/2015 | Seshadri | G06F 16/957 |
| | | | | 726/22 |
| 2017/0026493 | A1* | 1/2017 | Ahn | H04L 67/34 |
| 2017/0270083 | A1* | 9/2017 | Pruitt | G06F 16/93 |
| 2017/0300314 | A1* | 10/2017 | Lopyrev | G06F 9/45504 |
| 2017/0322787 | A1* | 11/2017 | Patidar | G06F 8/61 |
| 2019/0098115 | A1* | 3/2019 | Thangeswaran | H04L 67/34 |
| 2019/0102351 | A1* | 4/2019 | Wu | G06F 16/9574 |

FOREIGN PATENT DOCUMENTS

| | | | | |
|---|---|---|---|---|
| CN | 102694862 | 9/2012 | | |
| CN | 103092595 | 5/2013 | | |
| CN | 104113770 | 10/2014 | | |
| CN | 102624910 | 11/2015 | | |
| CN | 105278971 | 1/2016 | | |
| CN | 105786511 | 7/2016 | | |
| CN | 106202083 | 12/2016 | | |
| CN | 106209925 | 12/2016 | | |
| CN | 107111645 | 8/2017 | | |
| CN | 107786630 | 3/2018 | | |
| EP | 3018580 | A1 * | 5/2016 | G06F 8/61 |
| WO | WO 2016024987 | 2/2016 | | |
| WO | WO-2017167050 | A1 * | 10/2017 | G06F 16/955 |

OTHER PUBLICATIONS

Crosby et al., "BlockChain Technology: Beyond Bitcoin," Sutardja Center for Entrepreneurship & Technology Technical Report, Oct. 16, 2015, 35 pages.

International Search Report and Written Opinion in International Application No. PCT/CN2018/103499, dated Nov. 28, 2018, 9 pages (with Partial English Translation).

Nakamoto, "Bitcoin: A Peer-to-Peer Electronic Cash System," www.bitcoin.org, 2005, 9 pages.

Extended European Search Report in European Application No. 18854266.6, dated Mar. 13, 2020, 10 pages.

PCT International Preliminary Report on Patentability in International Application No. PCT/CN2018/103499, dated Mar. 10, 2020, 10 pages (with English translation).

* cited by examiner

METHOD, APPARATUS, AND DEVICE FOR PROCESSING WEB APPLICATION PACKAGE

CROSS-REFERENCE TO RELATED APPLICATIONS

This application is a continuation of PCT Application No. PCT/CN2018/103499, filed on Aug. 31, 2018, which claims priority to Chinese Patent Application No. 201710794843.7, filed on Sep. 6, 2017, and each application is hereby incorporated by reference in its entirety.

TECHNICAL FIELD

The present specification relates to the field of computer technologies, and in particular, to a method, an apparatus, and a device for processing a web application package.

BACKGROUND

With development of network technologies, ever-increasing web pages are used for web applications.

A service person usually integrates resource files involved in running of the web application, and provides the resource files for a web container in a form of a compressed application package, and the web container loads the compressed application package for user access. The compressed application package includes resources, such as a jar package, a class file, a css file, and a picture, needed for running the application.

Based on this, a more space-saving web application package generation method is needed.

SUMMARY

Implementations of the present specification provide a method, an apparatus, and a device for processing a web application package, to provide a more space-saving web application package generation method.

Based on this, an implementation of the present specification provides a method for processing a web application package. The method includes: determining a resource required by a web application; storing the resource, and determining a resource address corresponding to the resource; and generating a web application package that includes the resource address, where the web application package does not include the resource corresponding to the resource address.

In addition, an implementation of the present specification further provides a method for processing a web application package. The method includes: determining a resource address included in a web application package, where the resource address is determined before the application package is generated; obtaining a corresponding resource based on the resource address; and loading the web application package based on the resource.

In addition, an implementation of the present specification further provides an apparatus for processing a web application package. The apparatus includes: a determining module, configured to determine a resource required by a web application; a storage module, configured to store the resource, and determine a resource address corresponding to the resource; and a generation module, configured to generate a web application package that includes the resource address, where the web application package does not include the resource corresponding to the resource address.

In addition, an implementation of the present specification further provides an apparatus for processing a web application package. The apparatus includes: a determining module, configured to determine a resource address included in a web application package, where the resource address is determined before the application package is generated; an acquisition module, configured to obtain a corresponding resource based on the resource address; and a loading module, configured to load the web application package based on the resource.

An implementation of the present specification further provides a device for processing a web application package. The device includes: a memory, configured to store a web application package generation program; and a processor, configured to invoke the web application package generation program in the memory, and perform the following operations after receiving a web application package generation request: determining a resource required by a web application; storing the resource, and determining a resource address corresponding to the resource; and generating a web application package that includes the resource address, where the web application package does not include the resource corresponding to the resource address.

An implementation of the present specification further provides a device for processing a web application package. The device includes: a memory, configured to store a web application package loading program; and a processor, configured to invoke the web application package loading program in the memory, and perform the following operations after receiving a web application package loading request: determining a resource address included in a web application package, where the resource address is determined before the application package is generated; obtaining a corresponding resource based on the resource address; and loading the web application package based on the resource.

Correspondingly, an implementation of the present specification further provides a nonvolatile computer storage medium. The storage medium stores a computer executable instruction, and the computer executable instruction is used to perform the following operations: monitoring a web application package generation request; determining a resource required by a web application; storing the resource, and determining a resource address corresponding to the resource; and generating a web application package that includes the resource address, where the web application package does not include the resource corresponding to the resource address.

Correspondingly, an implementation of the present specification further provides a nonvolatile computer storage medium. The storage medium stores a computer executable instruction, and the computer executable instruction is used to perform the following operations: monitoring a web application package loading request; determining a resource address included in a web application package, where the resource address is determined before the application package is generated; obtaining a corresponding resource based on the resource address; and loading the web application package based on the resource.

The previous at least one technical solution used in the implementations of the present specification can achieve the following beneficial effects:

Various resources required by a specific web application are determined, some of the resources are uploaded to a storage device, a generated application package does not include the stored some of the resources, and the web application package includes resource addresses of the some of the resources in the storage device.

In the implementations of the present specification, a resource is uploaded to the storage device, and a generated web application compression package does not include the stored resource, and includes a corresponding resource address, so that the corresponding resource is obtained by using the address when the package is loaded. As such, the web application package is reduced by a large quantity of static resources, thereby reducing space occupied by the web application package.

DESCRIPTION OF IMPLEMENTATIONS

To make the objective, technical solutions, and advantages of the present application clearer, the following clearly and comprehensively describes the technical solutions of the present application with reference to specific implementations and the corresponding accompanying drawings of the present application. Apparently, the described implementations are merely some but not all of the implementations of the present application. All other implementations obtained by a person of ordinary skill in the art based on the implementations of the present application without creative efforts shall fall within the protection scope of the present application.

Based on the previous content, web application package processing can include generating a web application package and loading the generated web application package. A web application can include an application program accessed by using a web, and is a set of resources used on a web page to complete a certain task. A jar package is a compressed package obtained by packaging some classes that have been written in the java language. A page rendering control file can include a Hypertext Markup Language (HTML) file, a JavaScript (JS) file, a Cascading Style Sheets (CSS) file, etc. A view resource can include a sound file, a picture, a video, etc. that are used to display a page.

Figure 1:
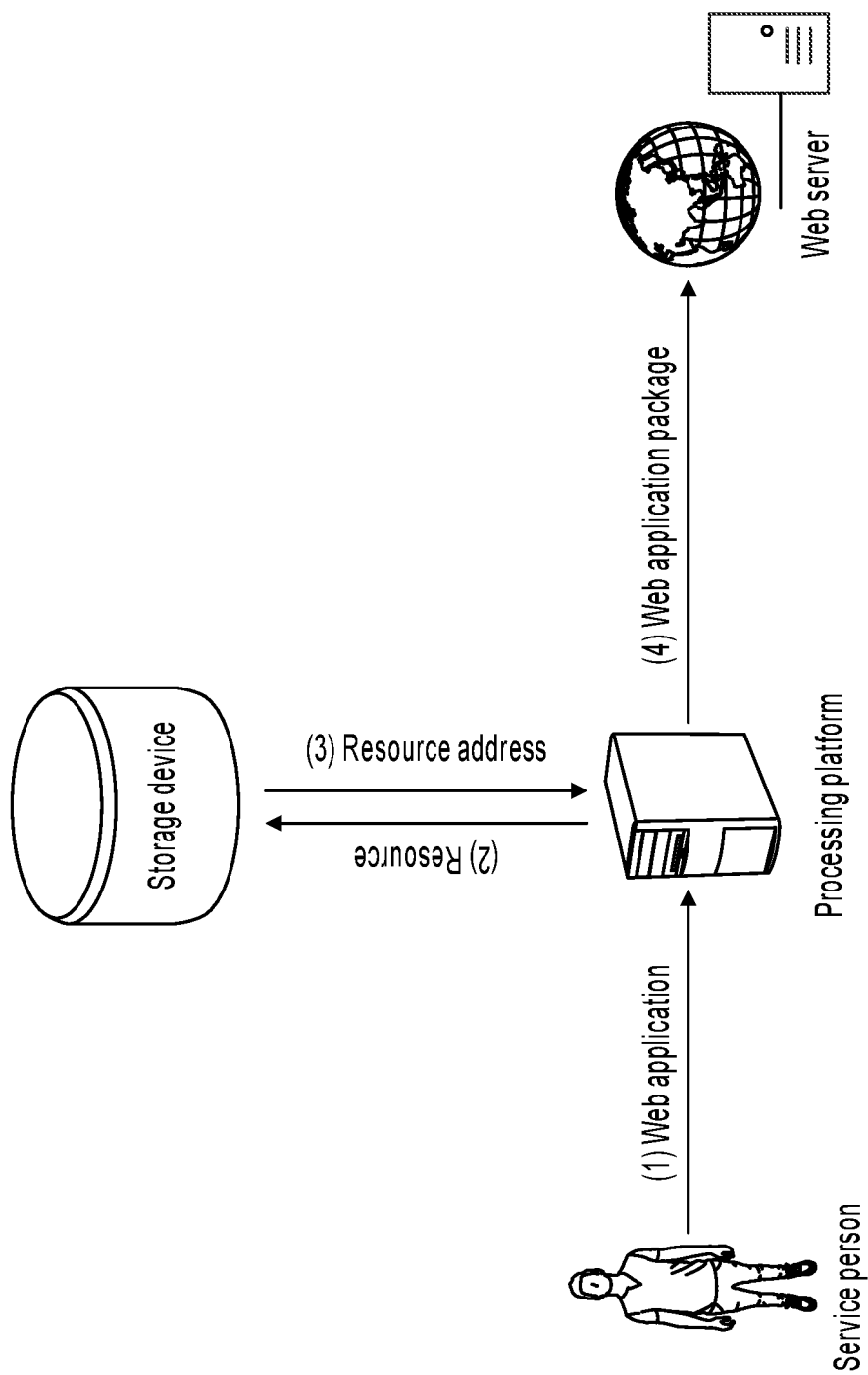
FIG. 1 is a schematic diagram illustrating an architecture, according to an implementation of the present specification.

In the implementations of the present specification, an architecture shown in FIG. 1 can be used for a web application package processing method. In the architecture, a web server provides various pages for user browsing; a storage device can be in a plurality of forms such as a hard disk and a database, and is configured to store some static resources required by a web application; and a processing platform can include various clustered or distributed processing devices. In practice, the processing device can include various CPUs, servers, etc. The processing platform can provide a user with other related service functions, for example, provide a one-stop service such as web application development, packaging, and deployment. The storage device and the processing device each can have a respective distributed, clustered, or blockchain structure.

Figure 2:
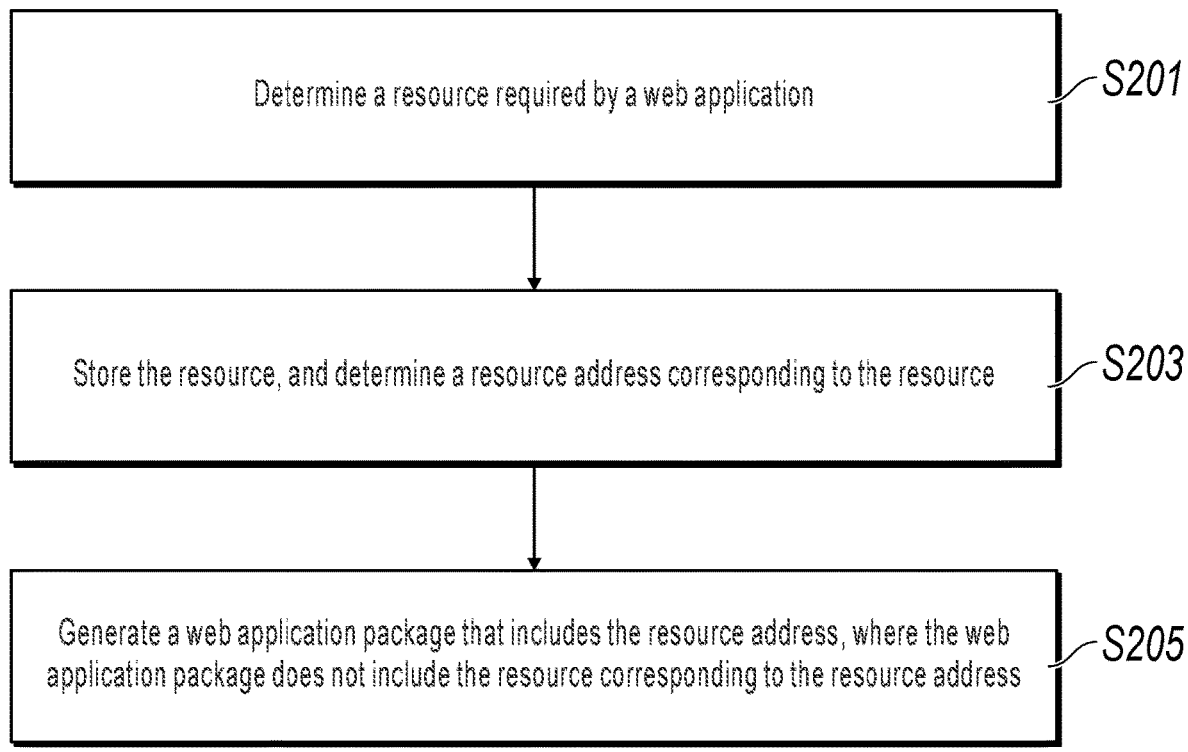
FIG. 2 is a schematic flowchart illustrating a method, according to an implementation of the present specification.

A data processing process provided in an implementation of the present specification is described below in detail based on the architecture shown in FIG. 1. As shown in FIG. 2, a web application package generation process includes the following steps.

Step S201: Determine a resource required by a web application.

Based on the previous content, the web application can include resources such as a plurality of servlets, JSP pages, HTML files, page rendering control files, view files, jar packages, permission control files, and process control files. The resources are developed based on a specific web application demand.

Specifically, resources such as the jar package, the page rendering control file, and/or the view file that are needed by the web application can be determined.

Step S203: Store the resource, and determine a resource address corresponding to the resource.

After the resource required by the web application is determined, a static resource such as the page rendering control file and/or the view file is uploaded to a storage device, a storage address of each resource in the storage device (for example, a URL address of the resource in the storage device) is obtained and recorded, and the storage address is determined as the resource address.

Step S205: Generate a web application package that includes the resource address, where the web application package does not include the resource corresponding to the resource address.

Specifically, the present step includes two aspects:

In one aspect, the generated web application package should include the address of the stored resource. This can be implemented in the following way: A resource reference file that includes the resource address is generated, and the web application package that includes the resource reference file is generated. To be specific, the obtained resource address is written to the resource reference file, and the resource reference file is packaged in the web application package, so that the corresponding resource is obtained based on the resource address when the application package is loaded.

In another aspect, the generated web application package does not include the resource corresponding to the resource address. To be specific, the resource that is uploaded to the storage device and whose address is recorded is not packaged. The uploaded resource can be manually excluded, or can be excluded in the following way:

A specified resource is packaged according to a predefined rule, and the web application package that includes the resource address is generated. The specified resource includes a resource with resource address information, and further includes a resource, other than the stored resource, needed when the web application runs.

In other words, the generated web application package includes the address corresponding to the stored resource, and does not include the stored resource. The two aspects are not executed in a specific order.

For example, resources, such as the jar package, the page rendering control file, and/or the view file, required by the web application are determined, the page rendering control file and/or the view file are/is uploaded to the storage device, and the corresponding resource address is recorded by using the resource reference file. In a predefined packaging rule, the specified resource includes the resource reference file, the jar package, and another resource needed by the web application, and does not include the page rendering control file and/or the view file, to implement the previous technical solution.

In the present implementation of the present specification, a resource is uploaded to the storage device, and a generated web application compression package does not include the stored resource, and includes a corresponding resource address, so that the corresponding resource is obtained by using the address when the package is loaded. As such, the web application package is reduced by a large quantity of static resources, thereby reducing space occupied by the web application package.

It is worthwhile to note that when an application is developed by using java, source code needs to be compiled into a class file for a computer to identify, only the class file is packaged, and the source code needs to be manually excluded. When a web application is developed by using a specific language (for example, a JS language), because the computer can directly identify a JS file, no compilation is needed, and no class file is generated during development. If the previous predefined packaging mode is used in this case, it can be further specified that a source code file (namely, the JS file) generated during development and another specified resource are uploaded to the storage device, and storage addresses of the source code file and the another specified resource are recorded. In this case, a generated web application package does not include the source code file.

In other words, if coding is performed by using JS, a web application package is generated by using the previous predefined packaging mode, and no class file is generated before packaging. As such, the generated package occupies less space. During packaging, it is more convenient because the source code file does not need to be manually excluded.

Figure 3:
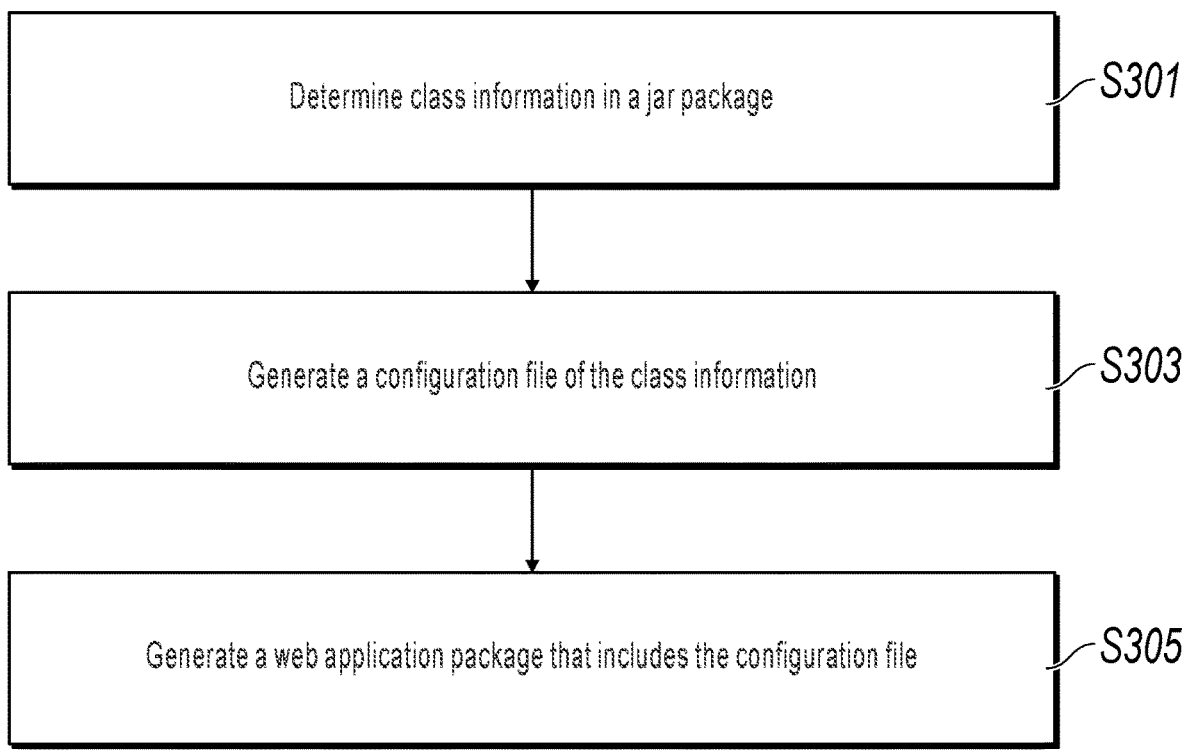
FIG. 3 is a schematic flowchart illustrating a part of a method, according to an implementation of the present specification.

In another implementation of the present specification, after the jar package required by the web application is determined, as shown in FIG. 3, the web application package generation method further includes the following steps:

Step S301: Determine class information in the jar package.

Step S303: Generate a configuration file of the class information.

Step S305: Generate the web application package that includes the configuration file.

In other words, the configuration file of the class information explicitly records the class information involved in the web application package. The generated web application package includes the configuration file, so that when the application package is loaded on a platform, the platform can establish a dedicated class loader for the application package based on the configuration file, to avoid a conflict caused when a plurality of web application packages are loaded.

Figure 4:
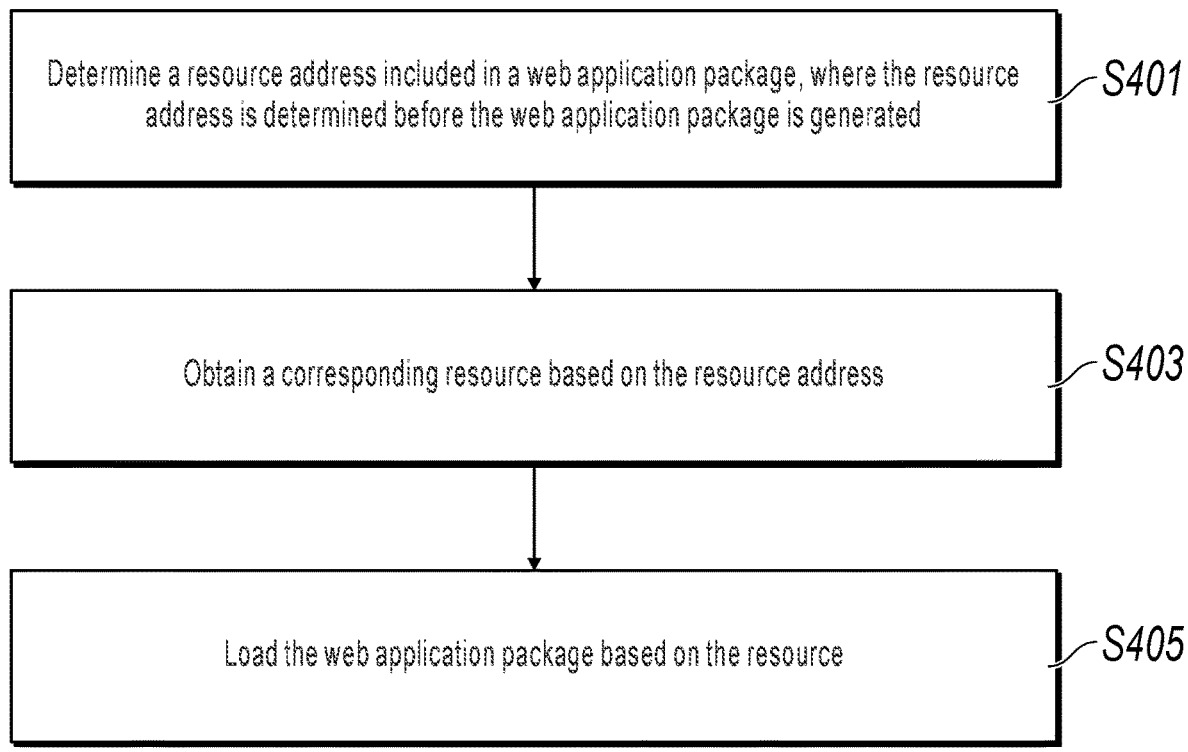
FIG. 4 is a schematic flowchart illustrating a method, according to an implementation of the present specification.

After the web application package is generated, the web application package is deployed on a web server, and in this case, the web server needs to load the web application package. In another implementation of the present specification, a web application package processing method is provided. As shown in FIG. 4, the method includes the following steps:

Step S401: Determine a resource address included in a web application package, where the resource address is determined before the application package is generated.

Step S403: Obtain a corresponding resource based on the resource address.

Step S405: Load the web application package based on the resource.

To be specific, in the loading process, a web server dynamically obtains the corresponding resource (for example, obtains a stored page rendering control file and a stored view file) based on the resource address in the web application package, and performs page rendering.

In another implementation of the present specification, the previous step S405 of loading the web application package based on the resource includes: determining a configuration file of class information in the web application package, where the configuration file of the class information includes class information in a jar package in the web application package, and is determined before the application package is generated; establishing a class loader based on the configuration file of the class information; and loading the web application package based on the resource by using the class loader.

To be specific, when loading the application package, the web server can establish a dedicated class loader based on the configuration file, to avoid a conflict caused when a plurality of web application packages are loaded.

Figure 5:
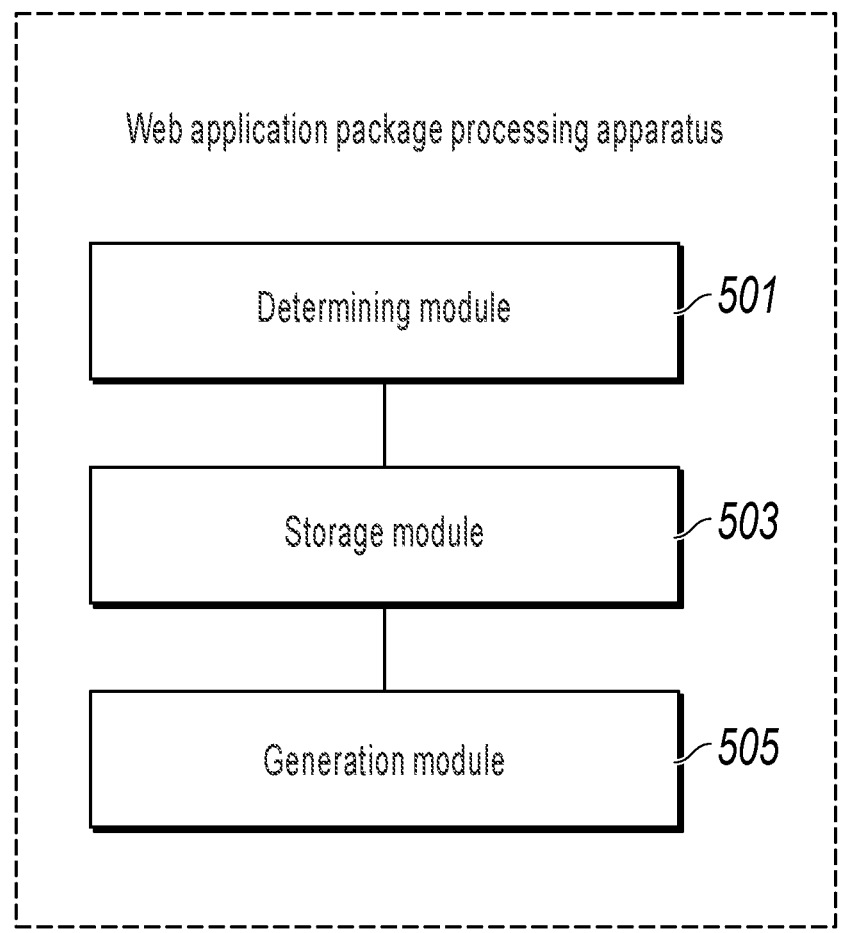
FIG. 5 is a schematic structural diagram of an apparatus, according to an implementation of the present specification.
Figure 6:
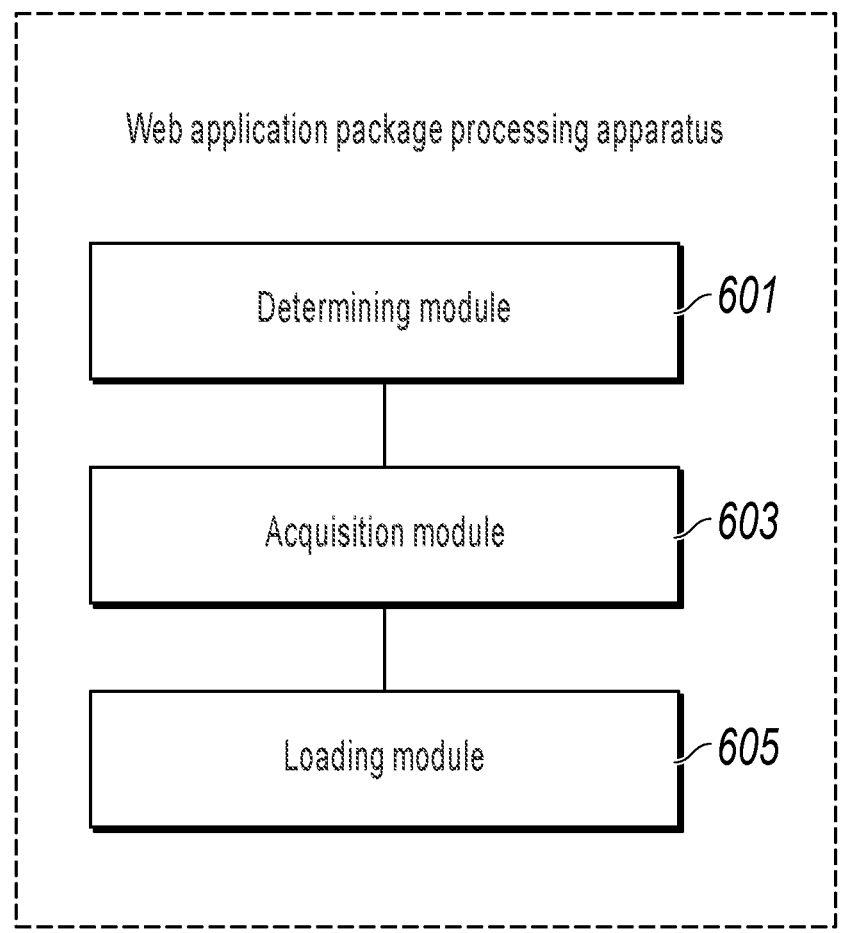
FIG. 6 is a schematic structural diagram of another apparatus, according to an implementation of the present specification.

Based on the same concept, an implementation of the present specification further provides a web application package processing apparatus. As shown in FIG. 5, the apparatus includes: a determining module 501, configured to determine a resource required by a web application; a storage module 503, configured to store the resource, and determine a resource address corresponding to the resource; and a generation module 505, configured to generate a web application package that includes the resource address, where the web application package does not include the resource corresponding to the resource address.

Further, the determining module 501 is configured to determine a jar package, a page rendering control file, and/or a view resource that are required by the web application.

Further, the generation module 505 is configured to determine class information in the jar package, generate a configuration file of the class information, and generate the web application package that includes the configuration file.

Further, the storage module 503 is configured to store the page rendering control file and/or the view resource, obtain a storage address of the page rendering control file and/or a storage address of the view resource, and determine the storage address as the resource address.

Further, the generation module 505 is configured to package a specified resource according to a predefined rule, and generate the web application package that includes the resource address.

Further, the generation module 505 is configured to generate a resource reference file that includes the resource address, and generate the web application package that includes the resource reference file.

An implementation of the present specification further provides a web application package processing apparatus. The apparatus includes: a determining module 601, configured to determine a resource address included in a web application package, where the resource address is determined before the application package is generated; an acquisition module 603, configured to obtain a corresponding resource based on the resource address; and a loading module 605, configured to load the web application package based on the resource.

Further, the acquisition module 603 is configured to obtain, based on the resource address, a page rendering control file and/or a view resource corresponding to the resource address.

Further, the loading module 605 is configured to determine a configuration file of class information in the web application package, where the configuration file of the class information includes class information in a jar package in the web application package, and is determined before the application package is generated; establish a class loader based on the configuration file of the class information; and load the web application package by using the class loader.

Correspondingly, the present specification further provides a web application package processing device. The device includes: a memory, configured to store a web application package generation program; and a processor, configured to invoke the web application package generation program in the memory, and perform the following operations after receiving a web application package generation request: determining a resource required by a web application; storing the resource, and determining a resource address corresponding to the resource; and generating a web application package that includes the resource address, where the web application package does not include the resource corresponding to the resource address.

Correspondingly, the present specification further provides another web application package processing device. The device includes: a memory, configured to store a web application package loading program; and a processor, configured to invoke the web application package loading program in the memory, and perform the following operations after receiving a web application package loading request: determining a resource address included in a web application package, where the resource address is determined before the application package is generated; obtaining a corresponding resource based on the resource address; and loading the web application package based on the resource.

Based on the same inventive concept, an implementation of the present application further provides a corresponding nonvolatile computer storage medium. The storage medium stores a computer executable instruction, and the computer executable instruction is used to perform the following operations: monitoring a web application package generation request; determining a resource required by a web application; storing the resource, and determining a resource address corresponding to the resource; and generating a web application package that includes the resource address, where the web application package does not include the resource corresponding to the resource address.

Correspondingly, an implementation of the present specification further provides another nonvolatile computer storage medium. The storage medium stores a computer executable instruction, and the computer executable instruction is used to perform the following operations: monitoring a web application package loading request; determining a resource address included in a web application package, where the resource address is determined before the application package is generated; obtaining a corresponding resource based on the resource address; and loading the web application package based on the resource.

The implementations of the present specification are described in a progressive way. For same or similar parts of the implementations, mutual references can be made to the implementations. Each implementation focuses on a difference from the other implementations. Particularly, the apparatus implementation, the device implementation, and the medium implementation are basically similar to the method implementation, and therefore are described briefly. For related parts, references can be made to related description in the method implementation. Details are omitted here for simplicity.

Specific implementations of the present specification are described above. Other implementations fall within the scope of the appended claims. In some situations, the actions or steps described in the claims can be performed in a sequence different from the sequence in the implementation and the desired results can still be achieved. In addition, the process depicted in the accompanying drawings does not necessarily require a particular execution sequence to achieve the desired results. In some implementations, multitasking and parallel processing can be advantageous.

In the 1990s, whether a technical improvement is a hardware improvement (for example, an improvement to a circuit structure such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of control logic of a memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component; or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the previous apparatus is described by dividing functions into various units. Certainly, when the implementations of the present specification are implemented, functions of each unit can be implemented in one or more pieces of software and/or hardware.

A person skilled in the art should understand that an implementation of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct a computer or another programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto a computer or another programmable data processing device, so that a series of operations and steps are performed on the computer or the another programmable device, thereby generating computer-implemented processing. Therefore, the instructions executed on the computer or other programmable devices provide steps for implementing a specific function in one or more processes in the flowcharts and/or in one or more blocks in the block diagrams.

In a typical configuration, a computing device includes one or more processors (CPU), input/output interfaces, network interfaces, and memories.

The memory can include a non-persistent memory, a random access memory (RAM), and/or a nonvolatile memory in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storage, a magnetic cassette, a magnetic tape, a magnetic disk storage or another magnetic storage device, or any other non-transmission medium that can be used to store information accessible to the computing device. Based on the definition in the present specification, the computer readable medium does not include transitory computer readable media (transitory media) such as a modulated data signal and carrier.

It is worthwhile to further note that the terms "include", "comprise", or their any other variants are intended to cover a nonexclusive inclusion, so that a process, a method, a product, or a device that includes a list of elements not only includes those elements but also includes other elements which are not expressly listed, or further includes elements inherent to such process, method, product, or device. An element preceded by "includes a . . . " does not, without more constraints, preclude the existence of additional identical elements in the process, method, product, or device that includes the element.

A person skilled in the art should understand that the one or more implementations of the present specification can be provided as a method, a system, or a computer program product. Therefore, the implementations of the present specification can use a form of hardware only implementations, software only implementations, or implementations with a combination of software and hardware. In addition, the implementations of the present specification can use a form of a computer program product that is implemented on one or more computer-usable storage media (including but not limited to a disk memory, a CD-ROM, an optical memory, etc.) that include computer-usable program code.

The implementations of the present specification can be described in the general context of computer executable instructions executed by a computer, for example, a program module. The program module usually includes a routine, a program, an object, a component, a data structure, etc. for executing a specific task or implementing a specific abstract data type. The implementations of the present specification can alternatively be practiced in distributed computing environments. In the distributed computing environments, tasks are executed by remote processing devices that are connected through a communications network. In the distributed computing environment, the program module can be located in both local and remote computer storage media including storage devices.

The implementations of the present specification are described in a progressive way. For same or similar parts of the implementations, mutual references can be made to the implementations. Each implementation focuses on a difference from the other implementations. Particularly, the system implementation is basically similar to the method implementation, and therefore is described briefly. For related parts, references can be made to related description in the method implementation.

The previous descriptions are merely implementations of the present specification, and are not intended to limit the present application. For a person skilled in the art, various modifications and changes can be made to the present specification. Any modification, equivalent replacement, improvement, etc. made within the spirit and the principle of the implementations of the present specification shall fall within the scope of the claims in the present application.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method comprising:
   obtaining a web application package, the obtaining comprising:
      determining a plurality of resources that will be required by a web application during runtime;
      storing one or more resources of the plurality of the resources at different storage locations than the web application package;
      determining one or more respective resource addresses corresponding to the storage locations of the one or more resources;
      generating a resource reference file that comprises the one or more respective resource addresses; and
      generating, according a predefined resource packaging rule, the web application package that comprises the resource reference file and excludes the one or more resources, wherein generating the web application package comprises:
         determining class information in a JAR package that will be required by the web application package during runtime;
         generating, from the class information, a configuration file for use in establishing a class loader when the web application package is loaded; and
         generating the web application package that comprises the configuration file;
   deploying the web application package on a web server; and
   in response to a loading request, loading the web application package, comprising:
      identifying, from data included in the web application package, the one or more respective resource addresses; and
      obtaining the one or more resources based on the one or more respective resource addresses.

2. The computer-implemented method according to claim 1, wherein determining the plurality of resources that will be required by the web application during runtime comprises:
   determining at least one of a jar package, a page rendering control file, or a view resource that is required by the web application.

3. The computer-implemented method according to claim 2, wherein storing the one or more resources and determining the one or more respective resource addresses corresponding to the storage locations of the one or more resources comprises:
   storing the page rendering control file or the view resource;
   obtaining a storage address of the page rendering control file or a storage address of the view resource; and
   determining the storage address as the resource address.

4. The computer-implemented method according to claim 2, wherein the view resource comprises a sound file, a picture, or a video that is used to display a web page.

5. The computer-implemented method according to claim 1, further comprising:
   compiling a source code into a class file; and
   wherein the web application package comprises the class file but excludes the source code.

6. The computer-implemented method according to claim 1,
   wherein the stored one or more resources comprise a source code file comprising uncompiled source code, and wherein the generated web application package excludes the source code file.

7. The computer-implemented method according to claim 6, wherein the source code file comprising uncompiled source code is a JavaScript file.

8. The computer-implemented method according to claim 1, wherein the predefined resource packaging rule specifies that when generating the web application package, including at least the resource reference file and the JAR package in the web application package, and excluding page rendering control files and view files from the web application package.

9. A non-transitory, computer-readable medium storing one or more instructions executable by a computer system to perform operations comprising:
   obtaining a web application package, the obtaining comprising:
      determining a plurality of resources that will be required by a web application during runtime;
      storing one or more resources of the plurality of the resources at different storage locations than the web application package;
      determining one or more respective resource addresses corresponding to the storage locations of the one or more resources;
      generating a resource reference file that comprises the one or more respective resource addresses; and
      generating, according a predefined resource packaging rule, the web application package that comprises the resource reference file and excludes the one or more resources, wherein generating the web application package comprises:
         determining class information in a JAR package that will be required by the web application package during runtime;

generating, from the class information, a configuration file for use in establishing a class loader when the web application package is loaded; and generating the web application package that comprises the configuration file;

deploying the web application package on a web server; and in response to a loading request, loading the web application package, comprising:

identifying, from data included in the web application package, the one or more respective resource addresses; and obtaining the one or more resources based on the one or more respective resource addresses.

10. The non-transitory, computer-readable medium according to claim 9, wherein determining the plurality of resources that will be required by the web application during runtime comprises:

determining at least one of a jar package, a page rendering control file, or a view resource that is required by the web application.

11. The non-transitory, computer-readable medium according to claim 10, wherein storing the one or more resources and determining the one or more respective resource addresses corresponding to the storage locations of the one or more resources comprises:

storing the page rendering control file or the view resource;

obtaining a storage address of the page rendering control file or a storage address of the view resource; and determining the storage address as the resource address.

12. A computer-implemented system, comprising:

one or more computers; and one or more computer memory devices interoperably coupled with the one or more computers and having tangible, non-transitory, machine-readable media storing one or more instructions that, when executed by the one or more computers, perform operations comprising:

obtaining a web application package, the obtaining comprising:

determining a plurality of resources that will be required by a web application during runtime;

storing one or more resources of the plurality of the resources at different storage locations than the web application package;

determining one or more respective resource addresses corresponding to the storage locations of the one or more resources;

generating a resource reference file that comprises the one or more respective resource addresses; and generating, according a predefined resource packaging rule, the web application package that comprises the resource reference file and excludes the one or more resources, wherein generating the web application package comprises:

determining class information in a JAR package that will be required by the web application package during runtime;

generating, from the class information, a configuration file for use in establishing a class loader when the web application package is loaded; and generating the web application package that comprises the configuration file;

deploying the web application package on a web server; and in response to a loading request, loading the web application package, comprising:

identifying, from data included in the web application package, the one or more respective resource addresses; and obtaining the one or more resources based on the one or more respective resource addresses.

13. The computer-implemented system according to claim 12, wherein determining the plurality of resources that will be required by the web application during runtime comprises:

determining at least one of a jar package, a page rendering control file, or a view resource that is required by the web application.

14. The computer-implemented system according to claim 13, wherein storing the one or more resources and determining the one or more respective resource addresses corresponding to the storage locations of the one or more resources comprises:

storing the page rendering control file or the view resource;

obtaining a storage address of the page rendering control file or a storage address of the view resource; and determining the storage address as the resource address.

* * * * *